US006967725B2

(12) United States Patent
Denk et al.

(10) Patent No.: US 6,967,725 B2
(45) Date of Patent: Nov. 22, 2005

(54) SYSTEM AND METHOD FOR OPTICAL SCANNING

(75) Inventors: Winfried Denk, Hekielberg (DE); Michale Sean Fee, New Vernon, NJ (US); Fritjof Helmchen, Heidelberg (DE); David William Tank, Princeton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 448 days.

(21) Appl. No.: 09/971,856

(22) Filed: Oct. 5, 2001

(65) Prior Publication Data

US 2002/0080359 A1 Jun. 27, 2002

Related U.S. Application Data

(60) Provisional application No. 60/240,447, filed on Oct. 13, 2000.

(51) Int. Cl.⁷ .............................................. G01B 11/24
(52) U.S. Cl. ...................................... 356/609; 356/601
(58) Field of Search ................................. 356/601–609

(56) References Cited

PUBLICATIONS

Delaney, P.M. et al., *Fiber–optic laser scanning confocal microscope suitable for fluorescence imaging*, Applied Optics, vol. 33, No. 4, Feb. 1, 1994, pp. 573–577.
Dickensheets, D.L., et al., *Micromachined scanning confocal optical microscope*, Optics Letters, vol. 21, No. 10, May 15, 1996, pp. 764–766.
Sabharwal, Y.S. et al., *Slit–scanning confocal microendoscope for high–resolution in vivo imaging*, Applied Optics, vol. 38, No. 34, Dec. 1, 1999, pp. 7133–7144.
Delaney, P.M. et al., *Novel microscopy using fibre optic confocal imaging and its suitability for subsurface blood vessel imaging in vivo*, Clinical and Experimental Pharmacology and Physiology, vol. 20, (1993), pp. 197–198.
Deleney, P.M., et al., *Fiberoptics in confocal microscopy*, Handbook of Biological Confocal Microscopy, (J.B. Pawley, ed., Plenum Press, New York), (1995), pp. 515–523.
Hofmann, U. et al., *Electrostatically driven micromirrors for a miniaturized confocal laser scanning microscope*, SPIE, vol. 3878, (1999), pp. 29–38.
"A Miniturized Two–Photon Fiber–Scanning Microscope For in Vivo Imaging" by F. Heimchen et al., Abstracts Society for Neuroscience, vol. 25, Aug. 1999, 1 page.

*Primary Examiner*—Gregory J Toatley, Jr.
*Assistant Examiner*—Amanda Merlino
(74) *Attorney, Agent, or Firm*—John F. McCabe

(57) ABSTRACT

An optical scanning system includes a probe and a processor. The probe includes a mechanical oscillator responsive to AC voltage signals and an optical fiber. The optical fiber has a free end that executes an oscillatory scanning motion in response to being mechanically driven by the mechanical oscillator. The processor is configured to receive measured intensities of light emitted from spots of a sample scanned by light from the free end of the optical fiber. The processor is also configured to assign intensities to image pixels based on the measured intensities of light. The acts of assigning compensate for variations in the density of the scanned spots.

18 Claims, 12 Drawing Sheets

FIG. 4
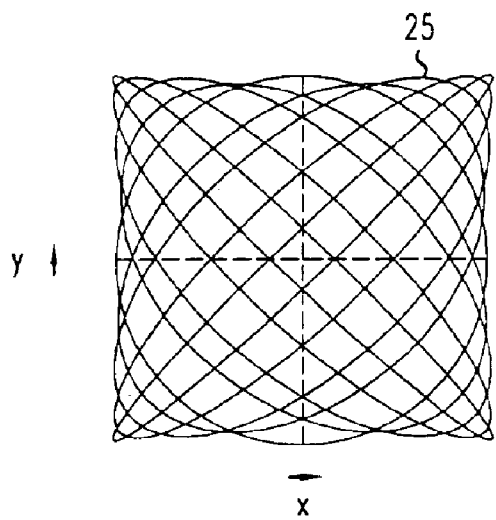
FIG. 5
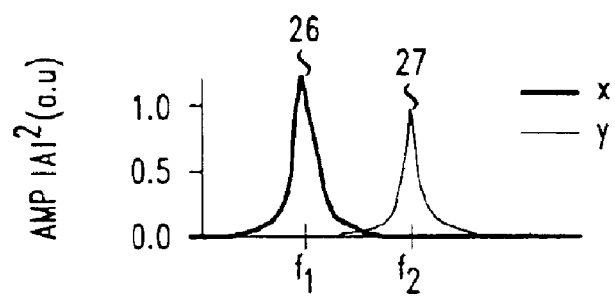
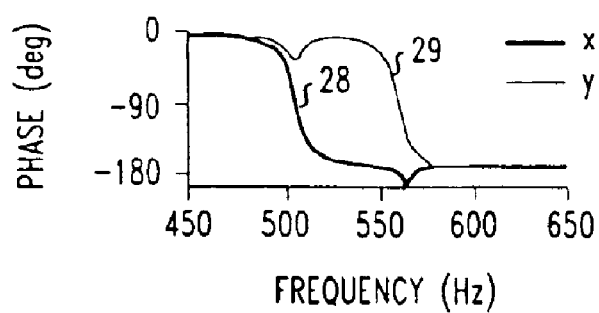

FIG. 7A
FIG. 7B
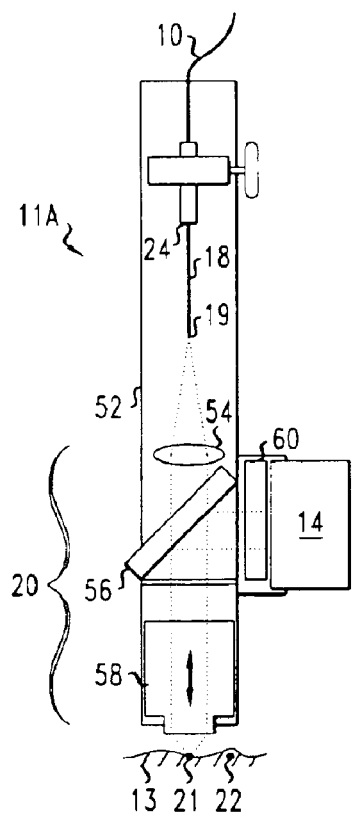
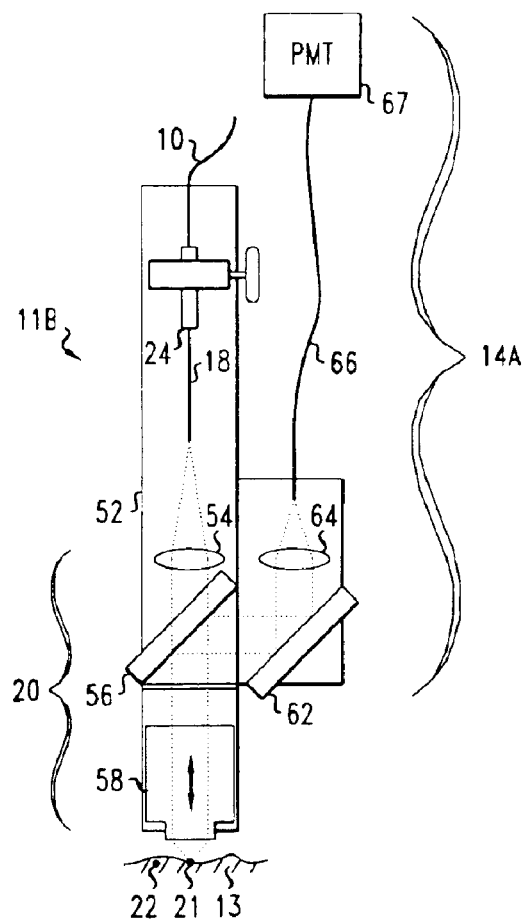

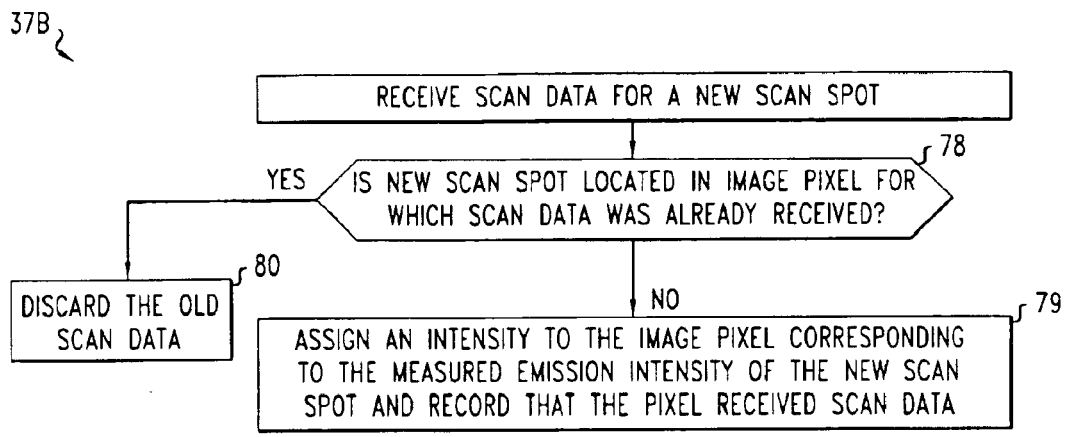

SYSTEM AND METHOD FOR OPTICAL SCANNING

This application claims the benefit of U.S. Provisional Application No. 60/240,447 filed on Oct. 13, 2000.

BACKGROUND OF THE INVENTION

1. Field of the Invention

This invention relates to optical scanners and microscopes.

2. Discussion of the Related Art

Several imaging techniques perform an optical scan of a sample and form a two-dimensional (2D) image of the sample from measured intensities of light emitted by the scanned spots of the sample. Herein, spots of the sample refer to portions of the sample that a focused beam of light is able to illuminate. One imaging technique is two-photon microscopy. In two-photon microscopy, a sample spot emits light as a result of a two-photon absorption event.

Two-photon microscopy often produces higher image resolutions than standard scattering-based microscopy. One reason for the higher resolution is that a two-photon microscope eliminates background light associated with scattering of scan light in the sample. This background light is eliminated by filtering light to remove the scan wavelength prior to measuring the intensities of light emitted by scanned spots. The filtering does not attenuate two-photon induced light, because the two-photon induced light has a different wavelength than the scan light. Another reason for the higher resolution is that a two-photon microscope has an inherently smaller scanned spot than a scattering-based microscope. The smaller spot results, because two-photon events are limited to a high-intensity portion of a spot that is smaller than the portion in which one-photon scattering occurs.

BRIEF SUMMARY OF THE INVENTION

In one aspect, the invention features an optical scanning system. The optical scanning system includes a probe and a processor. The probe includes a mechanical oscillator responsive to AC voltage signals and an optical fiber. The optical fiber has a free end that executes an oscillatory scanning motion in response to being mechanically driven by the mechanical oscillator. The processor receives measurements representative of light intensities emitted from spots scanned by light from the free end of the optical fiber. The processor is also configured to assign intensities to image pixels based on the measurements. The processor performs the acts of assigning in a manner that compensates for variations in the density of the scanned spots.

In another aspect, the invention features a process for optically scanning a sample. The process includes moving an end of an optical fiber along a self-crossing path by driving the fiber with a mechanical oscillator, scanning spots in a sample with light emitted from the moving end of the fiber, and assigning intensities to image pixels based on measured intensities of light emitted by the scanned spots. The acts of assigning include tracking numbers of the scanned spots that correspond to individual ones of the image pixels based on locations of the scanned spots.

In another aspect, the invention features a process for operating an optical scanning system. The process includes making an image of a sample by scanning spots in the sample, measuring intensities of light emitted by the scanned spots, determining locations of the scanned spots, and assigning intensities to image pixels based on the measured intensities and determined locations of the scanned spots. In the making of the image, the acts of determining depend on a value of a parameter. The process also includes selecting a new value for the parameter and deciding whether the image of the sample has less double imaging if the new value of the parameter is used during the acts of determining. The process accepts the new value of the parameter in response to determining that the new value produces less of the double imaging.

In other embodiments, the invention features a program storage device encoding a computer executable program of instructions for performing one or more of the above-described processes.

BRIEF DESCRIPTION OF THE SEVERAL VIEWS OF THE DRAWING

FIG. 4 shows a path traced out by oscillatory motion of the end of a scan fiber of FIG. 2 in response to being driven at a superposition of frequencies $f_x$ and $f_y$;

FIGS. 5 show X and Y component amplitudes and phases of the steady-state motion of scan fiber of FIG. 2 in response to being driven at various frequencies;

FIGS. 7A and 7B show alternate embodiments of the remote probe of FIG. 2;

FIGS. 9A and 9B are flow charts for processes that construct scan images in manners that compensate for non-uniformities in scanned spot distributions;

FIG. 10 is a flow chart showing one process for operating the scanning system of FIG. 1A;

DETAILED DESCRIPTION OF THE INVENTION

Figure 1A:
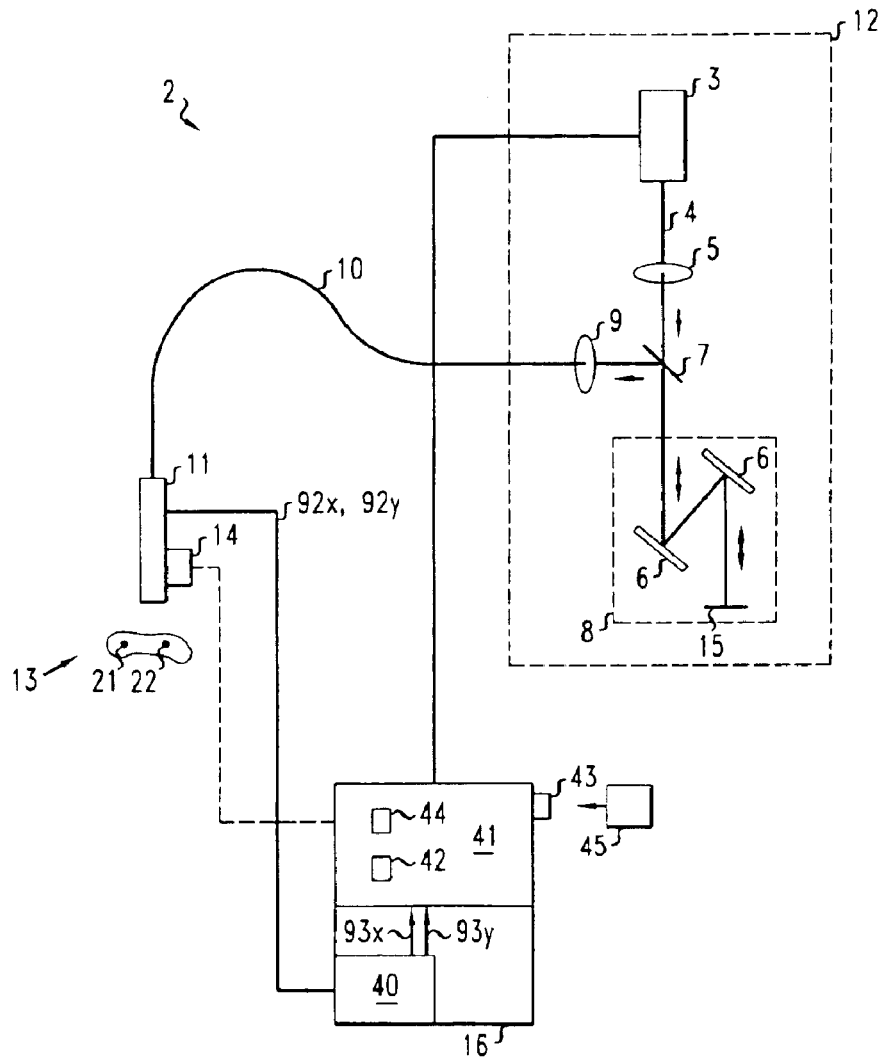
FIG. 1A shows a optical scanning system that produces 2D images of a sample.

FIG. 1A shows a scanning system 2 that constructs a 2D image of a sample 13. The scanning system 2 includes a laser 3 that produces a beam 4 of optical scan pulses. The beam 4 of scan pulses are collimated by lens 5 and sent to a birefringent slab 7. The birefringent slab 7 transmits the optical scan pulses to a pre-compensation system 8 that chirps the scan pulses to compensate for subsequent broadening. The system 8 routes the chirped scan pulses back to the birefringent slab 7, which reflects the chirped scan pulses to a focusing lens 9. The lens 9 inserts the chirped scan pulses into a transmission optical fiber 10, which delivers the optical pulses to a remote probe 11. An exemplary transmission fiber 10 enables the probe 11 to be 2 meters or more from the portion 12 of scanning system 2 that produces the scan pulses.

The probe 11 performs spatial scans of sample 13 with scan pulses delivered by transmission fiber 10. The probe 11 includes a detector 14, e.g., a photomultiplier tube, that measures intensities of light emitted by spots 21, 22 in the sample 13 in response to being scanned by the pulses. The detector 14 sends measured intensities to an external processor 16 that uses the measured intensities to construct a scan image of the sample 13.

Some exemplary scanning systems 2 function as a scattering microscope in which the light emitted by scanned spots 21, 22 is scattered light produced by the scan pulses.

Other exemplary scanning systems 2 function as a two-photon microscope in which light emitted by scanned spots 21, 22 is fluorescence light produced by two-photon absorption events. In the two-photon microscopes, the optical scan pulses need high intensities to produce the two-photon absorption events. To produce high enough intensities, one scanning system 2 uses a Tsunami, mode-locked titanium-sapphire laser made by Spectra-Physics Lasers Inc., 1335 Terra Bella Av., Mountain View, Calif. 94043-1847. The Tsunami laser produces pulses with intensities of about 4 to $40 \times 10^{10}$ photons, lengths of about 8 to $10 \times 10^{-14}$ seconds, and wavelengths of about 82 to 850 nanometers (nm).

To maintain high pulse intensities, scanning system 2 controls pulse broadening that is caused by dispersion and nonlinear optical effects in optical fiber 10. Dispersion broadens the pulses by giving different chromatic pulse components different velocities in the fiber 10. Nonlinear effects produce broadening by making different intensity portions of pulses experience different refractive indexes and hence, different velocities in the fiber 10. Either type of broadening leads to lower pulse intensities and decreases rates for two-photon events during scans of sample 13.

To reduce dispersion broadening, system 8 chirps pulses prior to insertion in transmission fiber 10. The chirping results from sending the pulses between doublet diffraction gratings 6, reflecting the pulses off reflector 15, and sending the pulses back through the doublet gratings 6. Between the doublet gratings 6, optical paths of longer wavelengths are longer than optical paths of shorter wavelengths. Thus, passage through the doublet gratings 6 places longer wavelength components of the pulses behind shorter wavelength components. Dispersion causes longer wavelength components of pulses to move faster than short wavelength components of the pulses while propagating in the fiber 10. Chirping places longer wavelength components behind shorter wavelength components of the pulse, which compensates for higher speeds of the longer wavelength components in the fiber 10 and reduces broadening of the pulse therein.

Figure 1B:
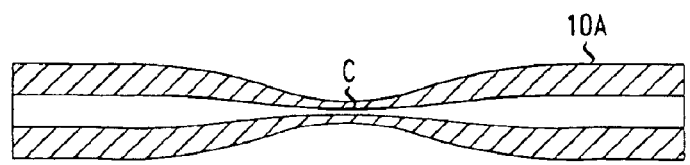
FIG. 1B shows an end of a multimode fiber adapted to convert pulses into propagating modes that fill a wide core of the fiber.

To reduce broadening from nonlinear effects, some embodiments use a multi-mode optical fiber for transmission fiber 10. The multi-mode fiber has a wider core than a single-mode fiber so that light intensities in the multi-mode fiber are lower than in a single-mode fiber carrying the same optical power as long as the optical pulses fill the larger core of the multi-mode fiber. To cause the pulses to fill the core, the pulses are inserted into the $T_{00}$ mode of the multi-mode fiber. FIG. 1B shows a multimode fiber 10A that has a constriction C near one end to improve insertion of pulses into the nodeless and core filing $T_{00}$ mode.

Other embodiments use a single-mode fiber for transmission optical fiber 10 and lower light intensities than in the embodiments using a multi-mode fiber. The lower intensities reduce pulse broadening from nonlinear effects to acceptable levels.

Figure 2:
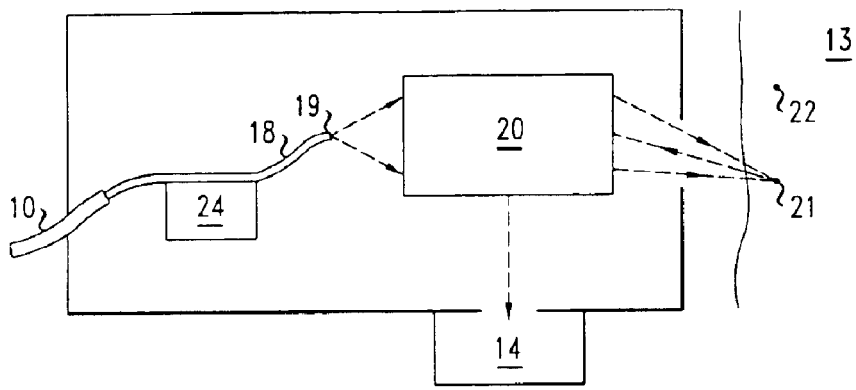
FIG. 2 shows a remote probe used in the scanning system of FIG. 1A.

FIG. 2 shows probe 11 of FIG. 1 in more detail. The probe 11 includes an optical scan fiber 18 that receives scan pulses from transmission fiber 10 and emits the received scan pulses from free end 19. Passive optical system 20 focuses the scan pulses to scan spots 21, 22 in sample 13. The passive optical system 20 also routes light emitted by the scanned spots 21, 22 to intensity detector 14.

The probe 11 also includes a mechanical oscillator 24 that drives free end 19 of the scan fiber 18 in steady-state oscillatory scan motions. An exemplary mechanical oscillator 24 includes a piezoelectric device with a bimorph or multi-layered structure that responds to AC voltage signals applied between central and outer layers of the structure by bending at the frequencies of the applied voltage signals. The bending motions generate simultaneous oscillatory motions of the free end 19 in X and Y directions, i.e., transverse to the axis of scan fiber 18.

Referring again to FIG. 1A, processor 16 includes an analog circuit 40 and a digital computer 41. The analog circuit 40 monitors AC voltage signals applied to mechanical oscillator 24 of FIG. 2 and outputs X and Y coordinate data for free end 19 of scan fiber 18 to the digital computer 41. The digital computer 41 uses the coordinate data from the digital circuit 41 and the measured intensity data from the detector 14 to construct a pixelated scan image of sample 13.

Digital computer 41 has an active memory 42, a drive 43, and a writable data storage device 44. The digital computer 41 is capable of executing a program that constructs image pixel data from received scan data and stores the image pixel data in the data storage device 44. The program is stored in executable form in either the active memory 42 or an external program storage device 45. Exemplary external program-storage devices 45 are optical disks or magnetic disks that are readable in the drive 43.

Figure 3:
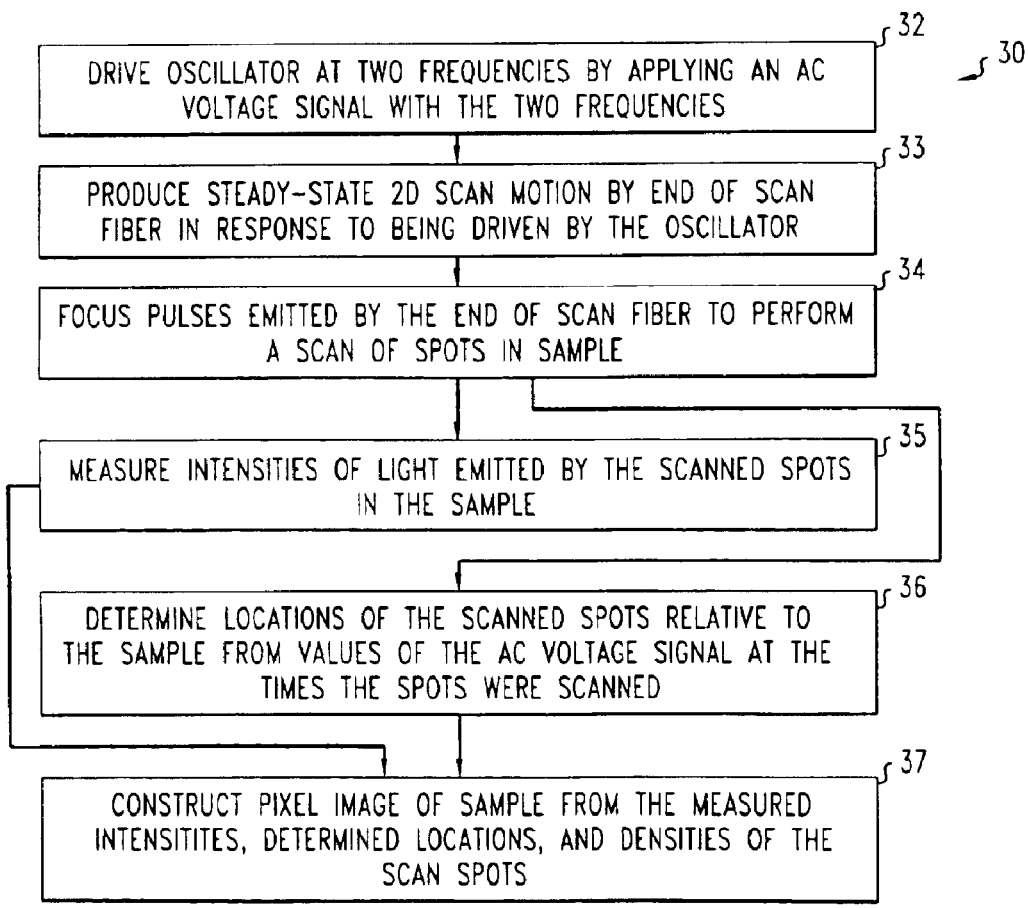
FIG. 3 is a flow chart for a process used by the system of FIG. 1A to scan a sample and produce an image with the scan data.

FIG. 3 is a flow chart for an imaging process 30 performed by the scanning system 2 that is shown in FIGS. 1A and 2. During a scan of sample 13, an AC voltage signal with frequency components $f_x$ and $f_y$ drives mechanical oscillator 24 to oscillate at both frequency $f_x$ and frequency $f_y$ (step 32). For a stable scan pattern, the voltage source (not shown) producing the AC voltage signal has, e.g., a synthesized signal generator uses a crystal oscillator to establish a stable relationship between the phases of the $f_x$ and $f_y$ frequency components of the voltage signal. The oscillations of the oscillator 24 produce steady-state 2D scan motions by free end 19 of scan fiber 18 (step 33). The scan motions of the free end 19 of the scan fiber 18 trace out a Lissajous pattern.

FIG. 4 shows the Lissajous pattern 25 traced out by the steady-state scan motion of free end 19 in response to the scan fiber 18 being driven by a superposition of frequencies $f_x$ and $f_y$. The X and Y coordinates of the scan motion of the free end 19 in time "t" are described by:

$X(t) = A_x \cos(2\pi f_x t + \phi_x)$ and $Y(t) = A_y \cos(2\pi f_y t + \phi_y)$.

Here, $\phi_x$ and $\phi_y$ are the phase lags of the X and Y coordinates of the oscillatory scan motion behind the phases of the AC voltage signals driving mechanical oscillator 24. Exemplary frequencies $f_x$ and $f_y$ satisfy the equations $f_x/N_x = f_y/N_y = f$ with $N_x$ and $N_y$ mutually prime integers. Thus, the free end 19 executes 2D oscillatory motion with a period $T = f^{-1}$ that is longer than those of the X- and Y-coordinate motions. The free end 18 sweeps out a path with crossings. Average distances between lines of crossings along the Y-axis and X-axis axes are of order $A_x/2N_x$ and $A_y/2N_y$, respectively.

Driving the scan fiber 18 by the superposition of frequencies $f_x$ and $f_y$ produces a resonant response in both the X-coordinate and the Y-coordinate of the oscillatory motion of free end 19. At steady state, both the X and the Y coordinate amplitudes and phases depend on the driving frequencies of mechanical oscillator 24.

FIG. 5 shows how the X-coordinate and Y-coordinate oscillatory motions respond to various driving frequencies. The coordinate amplitudes 26, 27 have resonant characters near different peak frequencies $f_1$ and $f_2$. Since the peak about $f_1$ and the peak about $f_2$ do not overlap, only one component amplitude 26, 27, i.e., X or Y, is resonant at one driving frequency. The phases 28, 29 of the X-coordinate and Y-coordinate motions of the scanning end 19 responses also depend on the driving frequency. The resonant amplitude coordinate 26 or 27 has a phase 28 or 29 that lags behind the phase of the AC voltage signal driving the mechanical oscillator 24, e.g., a 90° lag at peak resonance. The non-resonant amplitude coordinate 27 or 26 also has a phase 29 or 28 that is shifted with respect to the driving AC voltage signal. The shift in phase 29 or 28 of the non-resonant coordinate is due to a cross coupling with the amplitude 26 or 27 of the resonant coordinate.

Referring again to FIG. 3, as free end 19 of scan fiber 18 performs steady-state oscillatory motions, passive optical system 20 focuses scan pulses emitted by the free end 19 to a sequence of spots 21, 22 in sample 13 (step 34). The scanned spots 21, 22 sweep out a scan path in the sample 13. The scan path has the same shape as the path traced out by the free end 16 and defines inherent image resolutions that are equal to average distances between crossings on the path. For the Lissajous pattern 25 of FIG. 4, the average distances between Y-axis and X-axis crossings of the scan path are $M\Delta X$ and $M\Delta Y$, respectively, with $M\Delta Y = MA_x/2N_x$ and $M\Delta Y = MA_y/2N_y$. Here, "M" is the magnification produced by passive optical system 20.

In response to being scanned, spots 21, 22 emit light either by fluorescence or scattering. Detector 14 measures the intensities of light emissions from the scanned spots 21, 22 (step 35). In exemplary scanning systems 2 for two-photon microscopy, the detector 14 only measures fluoresced light produced by two-photon absorption events. The processor 16 determines locations of the scanned spots 21, 22 from values of the AC voltage signals applied to mechanical oscillator 24 at the time that the spots 21, 22 were scanned (step 36). From the values of the AC voltage signals and pre-determined phase lags $\phi_x$ and $\phi_y$, processor 16 determines locations of the free end 19 of the scan fiber 18 or equivalently the X and Y coordinates of the scanned spots 21, 22. The processor 16 constructs an image of the sample 13 from the measured intensities of light emissions by, the determined locations of, and the densities of the scanned spots 21, 22 (step 38). In the pixel image data, the processor 16 factors in non-uniformities in distributions of the scanned spots 21, 22 when determining the intensities of image pixels.

To produce a 2D image, an oscillating scan fiber 18 needs to trace out a Lissajous pattern that crosses itself. Crossings occur, because the scan fiber 18 has different resonant frequencies for X-coordinate and Y-coordinate oscillatory motions and the scan fiber 18 is driven by a superposition of drive components with frequencies near both resonant frequencies. A conventional round fiber has the same resonant frequency for oscillatory motions in different directions and thus, cannot be driven to trace out a Lissajous pattern that crosses itself.

Figure 6:
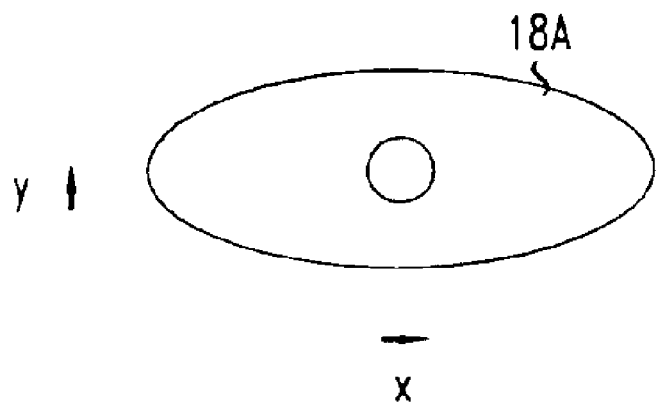
FIGS. 6A–6B are cross-sectional views of alternate embodiments of the scan fiber of FIG. 2.
FIG. 6C is a side view of another embodiment of the scan fiber of FIG. 2.
FIG. 6D shows how resonant frequencies of X-direction and Y-direction oscillatory motions of the scan fiber of FIG. 6C depend on the fiber's free tip length.
Figure 6:
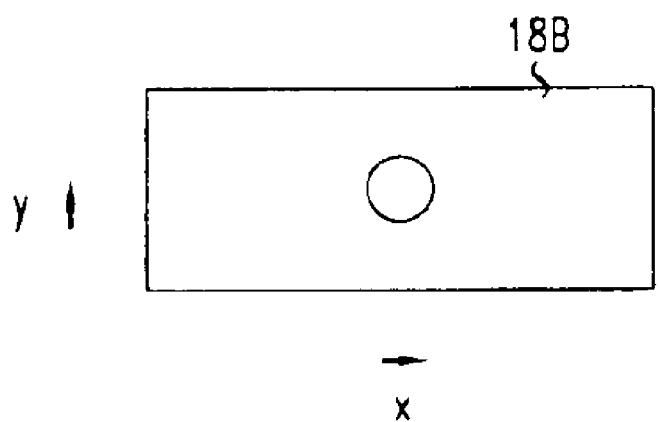
Figure 6C:
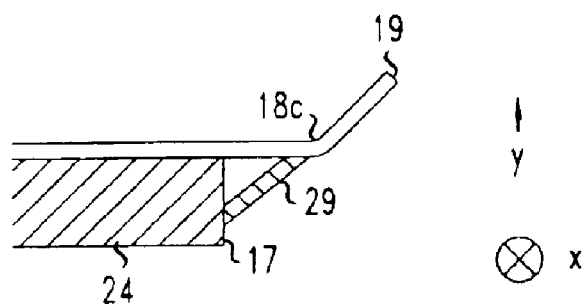
Figure 6D:
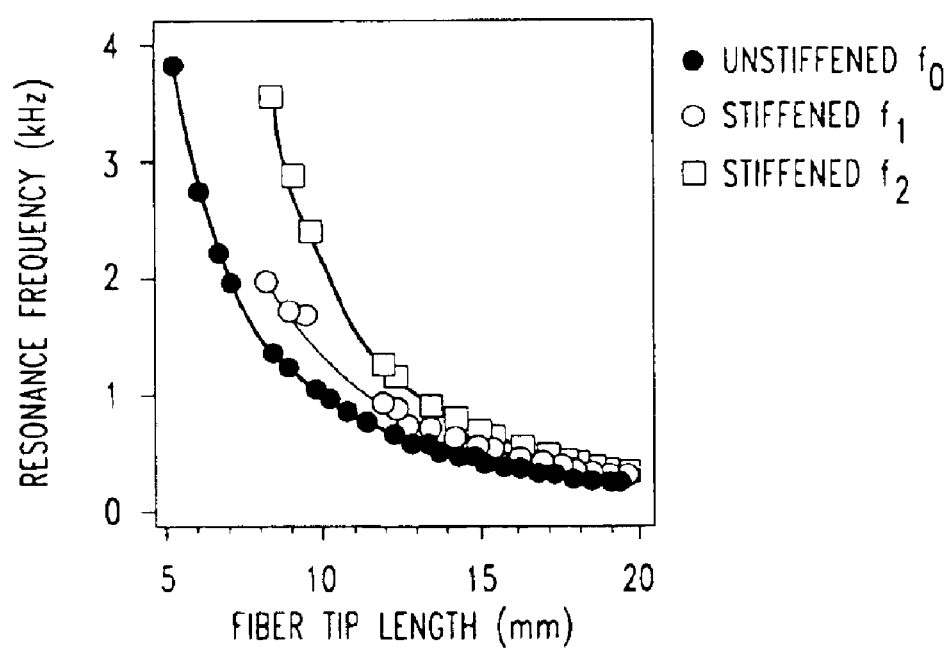

FIGS. 6A–6C show exemplary scan fibers 18A–18C for use in probe 11 of FIGS. 1A and 2. The scan fibers 18A and 18B have non-axially symmetric cross sections, i.e., oval and rectangular cross sections. The non-axially symmetric cross sections produce different resonant frequencies for X-coordinate and Y-coordinate oscillatory motions. The scan fiber 18C physically couples to a side surface 17 of mechanical oscillator 24 through a semi-rigid strut 29. The strut 29 impedes a protruding portion of the fiber 18C, which is located adjacent the side surface 17, from bending in the Y-direction while allowing the protruding portion to bend in the X-direction. Thus, the strut 29 makes the bending lengths of the free end 19 differ in the transverse X-direction and the transverse Y direction. This causes the scan fiber's frequencies $f_1$ and $f_2$ for resonant oscillations X-coordinate and Y-coordinate to differ. The dependence of the resonant frequencies $f_1$ and $f_2$ on the length of the free end 19 of scan fiber 18C is shown in FIG. 6D for an embodiment in which stiffening strut 29 is glued to the fiber 18C about 2.5 millimeters from the side surface 17. For comparison, the resonant frequency $f_0$ for a similar fiber without the stiffening strut 29 is also shown.

FIG. 7A shows an embodiment 11A of remote probe 11 of FIGS. 1A and 2 for performing two-photon microscopy. The probe 11A includes a metal housing 52 that provides physical support and fixes relative locations of mechanical oscillator 24, passive optical system 20, and intensity detector 14 in the probe 11A.

In the probe 11A, passive optical system 20 includes a component to focus scan pulses into sample 13 and a component to route light emitted by sample 13 in response to being scanned. The focusing component includes a collimating lens 54, a moveable objective lens 58, and a dichroic slab 56. The objective lens 58 moves longitudinally to focus scan pulses from free end 19 of the scan fiber 18 to spots 21, 22 at a selected depth in the sample 13. To focus the scan pulses to a selected depth, either a pneumatic system or an electric motor longitudinally repositions the objective lens 58 in the housing 52. The dichroic slab 56 is wavelength-selective and transmits light of the scan pulses. The routing component includes the objective 58, the dichroic slab 56, and an emission filter 60. The dichroic slab 56 wavelength-selectively reflects fluoresced light that is emitted by scanned spots 21, 22 in response to two-scan-photon absorption events. Reflection by the dichroic slab 56 reroutes the fluoresced light from the scanned spots 21, 22 in the sample 13 to intensity detector 14. The anti-reflection filter 60 stops reflections off the face of the intensity detector 14.

FIG. 7B shows an alternate embodiment 11B of probe 11 of FIGS. 1 and 2. In the probe 11B, intensity detector 14A includes a portion internal to the probe 11B and a portion external to the probe 11B. The internal portion includes a reflector 62 that receives light emitted by scanned spots 21, 22, i.e., via passive optical system 20, and a lens 64 that inserts the received light into a multimode optical fiber 66. The external portion includes the multi-mode optical fiber 66 and a remote photomultiplier tube 67. The multi-mode fiber 66 optically couples the internal portion of the detector 14A to the remote photomultiplier tube 67, which measures the intensities of the light emitted by the scanned spots 21, 22.

Since both the bulky photomultiplier tube 67 and bulky source laser 3 are remote in probe 11B, some embodiments of the probe 11B are smaller than those of probe 11A. The size of those embodiments of probe 11B are adapted for use in endoscopic medical applications in which the probe 11B is inserted into body cavities to perform in vivo imaging.

Figure 8:
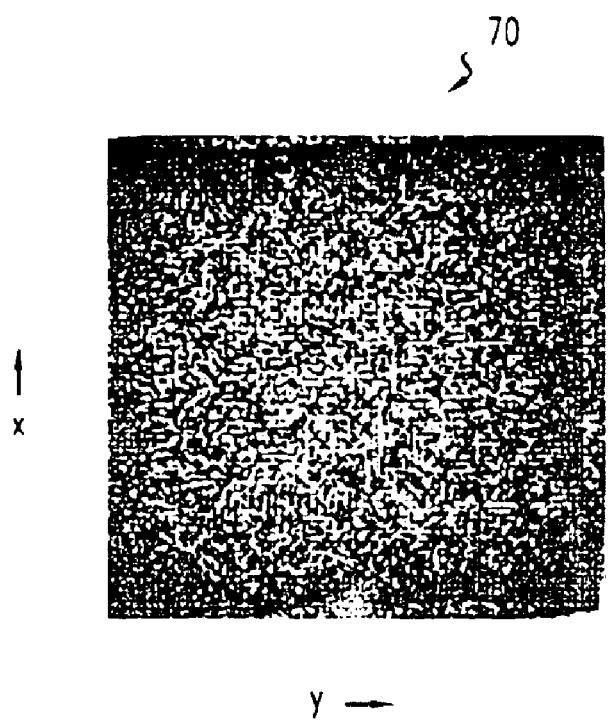
FIG. 8 shows the distribution of scanned spots for one set of driving frequencies of the remote probe of FIG. 2.

FIG. 8 shows the non-uniform distribution 70 of scanned spots produced on a screen by scan pulses emitted from scan fiber 18 while free end 19 moves along a self-crossing Lissajous pattern. The free end 19 of the fiber 18 emits the scan pulses at regular temporal intervals. The scanned spot distribution 70 is non-uniform for two reasons. First, similar to Lissajous pattern 25 of FIG. 4, the Lissajous pattern that produced the distribution 70 does not uniformly fill the rectangular scan region. Second, the scan speed changes with location along the scan path. The scan speeds are lower near turning points of the scan path and higher between the turning points. Non-uniform scanned spot distributions occur when a scan path has the form of a Lissajous pattern.

Figure 9A:
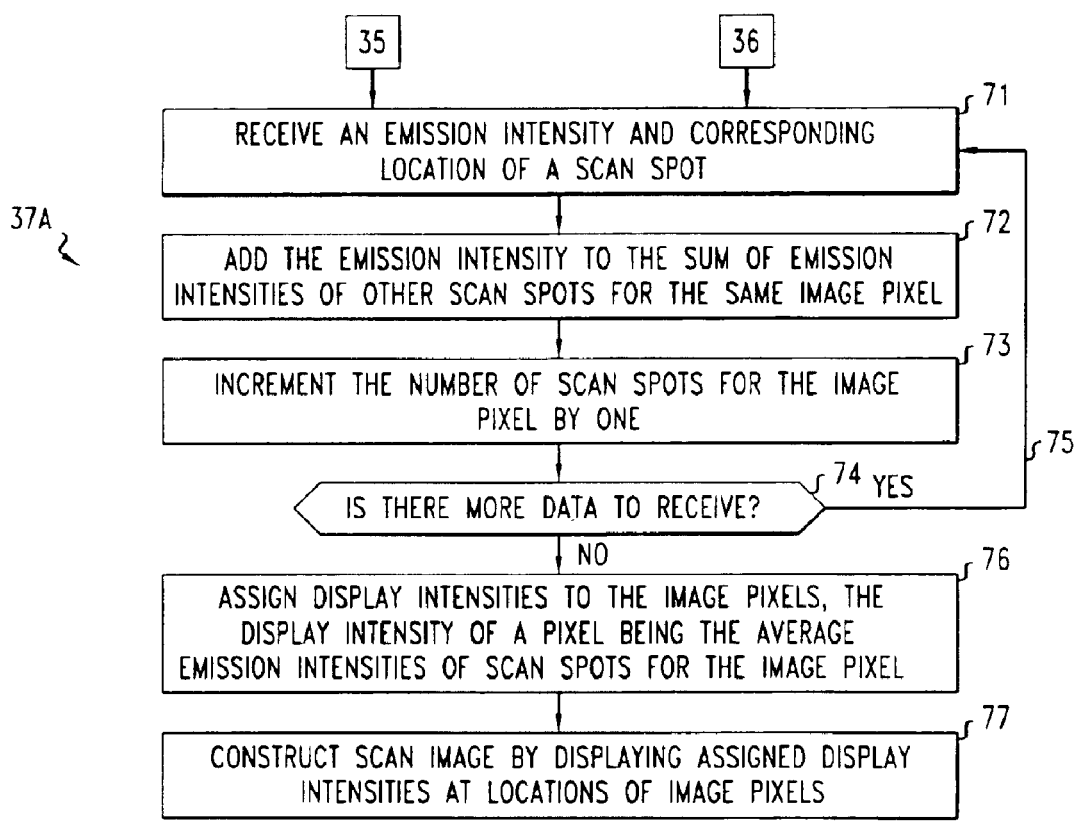

FIG. 9A shows a flow chart for a process 37A for image construction step 37 of FIG. 3, which compensates for non-uniform distributions of scanned spots. The process 37A is performed by computer 41 of FIG. 1A. The computer 41 receives data for a measured emission intensity and a location that correspond to a scanned spot 21, 22 (step 71). The computer 41 updates image pixel data by adding the measured emission intensity to a sum of measured emission intensities from earlier scanned spots whose locations correspond to the same image pixel (step 72). The computer 41 also increments by one a sum indicative of the number of scanned spots for the same image pixel (step 73). Then, the computer determines whether a scan period is complete (step 74). In exemplary embodiments, completion of the scan period is determined by the amount of time remaining in a preselected total scan time. If more scan time remains, the computer loops back to receive more scan data (75). If the scan period is complete, the computer 41 uses the received scan data to assign display intensities to the image pixels (step 76). The assigned display intensity of an image pixel is the average of the measured emission intensities of the scanned spots whose locations correspond to the image pixel. Defining image pixel intensities by averaged intensities compensates for non-uniformities in the scanned spot distribution. The computer 41 constructs the image of the sample 13 by displaying the assigned intensities of the image pixels at locations on a Cartesian pixel display that correspond to the locations of the image pixels (step 77).

FIG. 9B is a flow chart for a process 37B that other exemplary computers 41 use to perform image construction step 37 of FIG. 3 in a manner that compensates for non-uniform distributions of scanned spots. In response to receiving scan data for a newly scanned spot, computer 41 determines whether the newly scanned spot has a location corresponding to an image pixel for which scan data has already been received (step 78). The computer 41 keeps an array to track which image pixels have received scan data. Scan data has already been received if an earlier scanned spot had a location corresponding to the same image pixel. If scan data has not already been received for the pixel, the computer 41 assigns the image pixel an intensity that is representative of the measured emission intensity for the newly scanned spot and updates the above-mentioned array to indicate that the image pixel has received scan data (step 79). If scan data has been previously received for the pixel, the computer 41 replaces the old scan data for the pixel with the data from the newly scanned spot (step 80). By saving only one set of scan data per image pixel, the computer 41 compensates for non-uniformity in the distribution of scanned spots, i.e., the computer avoids double counting.

Alternate embodiments avoid double counting of pixel image data in a manner similar to that of process 37B of FIG. 9B. In these embodiments, the system saves old scan data for a pixel rather than the new scan data when the system determines that the new scan data corresponds to the same pixel.

FIG. 10 is a flow chart for an operating process 81 for scanning system 2 of FIGS. 1A and 2. The process 81 includes calibrating processor 16 to correctly determine the X, Y coordinates of scanned spots 21, 22 from the values of the AC voltage signals driving oscillator 24 (step 82). The calibration sets values of control parameters that compensate for phase lags between oscillatory motions of scan fiber 18 and the AC voltage signals. The calibration also sets the values of control parameters that compensate for cross-couplings of individual frequency components of the AC voltage driving signals to non-resonant components of the motion of scan fiber 18. Without such a calibration, correspondences between positions of scan spots and image pixels would be incorrectly determined. The calibration step adjusts, e.g., for variations in individual probes 11, e.g., physical variations in fiber 18 and oscillator 24. These variations make the phase lags and cross-couplings vary from probe to probe. In an exemplary embodiment, the control parameters are control voltages to analog circuit 40. Second, the scanning system 2 performs process 30 of FIG. 3 to produce a scan image based on the values of the control parameters set by the calibration step (step 83).

Figure 11A:
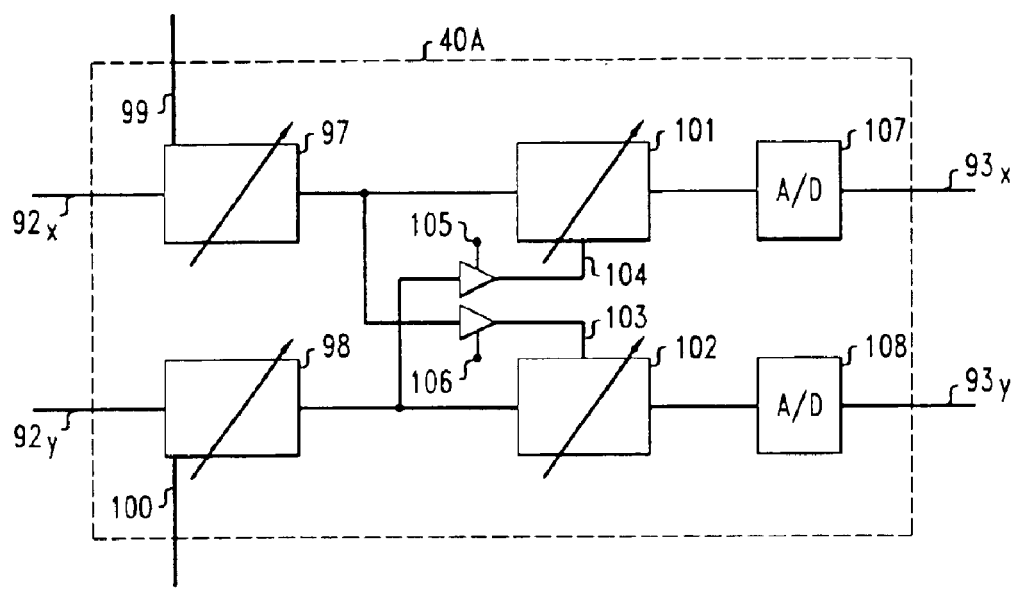
FIG. 11A shows a circuit that produces digital signals indicative of scanned spot locations from voltage signals driving the mechanical oscillator of FIGS. 2, 7A and 7B.

FIG. 11A shows one embodiment 40A of analog circuit 40 of FIG. 1. The circuit 40A has an input lines 92X and 92Y for receiving the AC voltage signals that drive mechanical oscillator 24 at frequencies $f_x$ and $f_y$, respectively. The circuit 40A also includes output terminals 93X, 93Y that provide digital signals proportional to the respective X and Y coordinate locations of scanned spots 21, 22 when the circuit 40A is properly calibrated. The input lines 92X and 92Y connect to variable phase shifters 97, 98. When voltages at control terminals 99, 100 are properly calibrated, phase shifters 97, 98 produce output voltages proportional to the X-coordinate and the Y-coordinate of scanned spots 21, 22. Exemplary phase shifters 97, 98 include RLC-circuits with variable capacitances or inductances. The output terminals of the variable phase shifters 97, 98 connect to input terminals and cross-connect to control terminals 103, 104 of cross-coupling correction circuits 101, 102. The cross-coupling correction circuits 101, 102 shift phases of the inputted voltages to correct for cross-couplings between the X-coordinate and the Y-coordinate of the motion of the scan fiber 18. Exemplary cross-coupling correction circuits 101, 102 are RLC-circuits having variable capacitances or inductances whose values are set by X and Y amplitudes of the voltage signals applied at control terminals 104, 103. Variable amplifiers with control terminals 105, 106 enable using control voltages to set the strengths of the cross-coupling corrections for the particular scan fiber 18 used. Output signals from the cross-coupling correction circuits 101, 102 go to analog-to-digital converters 107, 108, which digitalize the output voltages for transmission to digital computer 41.

Figure 11B:
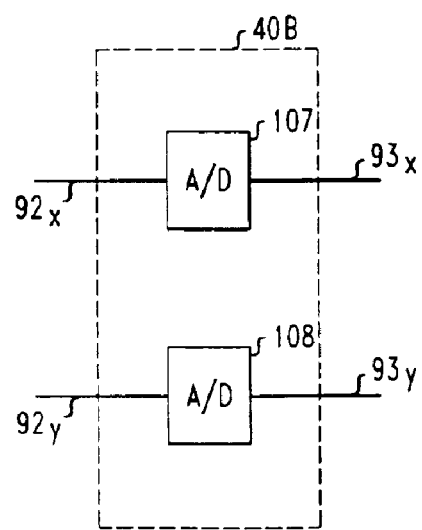
FIG. 11B shows a circuit that produces digital signals indicative of the voltage signals driving the mechanical oscillator of FIGS. 2, 7A and 7B.

FIG. 11B shows another embodiment 40B of analog circuit 40 of FIG. 1A in which the digital signals on output terminals 93X and 93Y are representative of the respective $f_x$ and $f_y$ frequency components of the AC voltage signal driving mechanical oscillator 24 of FIG. 2. The circuit 40B includes analog-to-digital converters 107, 108 that receive $f_x$ and $f_y$ frequency components of the voltage signals from lines 92X and 92Y, respectively. The output signals for the analog-to-digital converters 107, 108 provide the digitalized signals indicative of the AC driving voltage signals on terminals 93X and 93Y. From these signals, the computer 41 determines the X-coordinate and the Y-coordinate of scanned spots 21, 22. To determine the coordinates, the computer 41 executes a computer program. The program accounts for both the phase lags between the motion of scan fiber 18 and the frequency components of the AC voltage signals and for the cross-couplings between the X-coordinate and the Y-coordinate of the motion of the scan fiber 18. The program includes adjustable parameters, i.e., stored numbers, for the values of the phase lags and cross-couplings.

Calibration step 82 of FIG. 10 entails setting control parameters that calibrate determinations of scanned spot coordinates from the value of the AC voltage signals driving mechanical oscillator 24. The parameters are control voltages if the scan system 2 uses the analog circuit 40A of FIG. 11A or control parameters of a program executed in computer 41 if the scan system 2 uses analog circuit 40B of FIG. 11B. The control parameters are set through a feedback process 82A performed manually by a user or automatically by a controller, e.g., computer 41.

Figure 12:
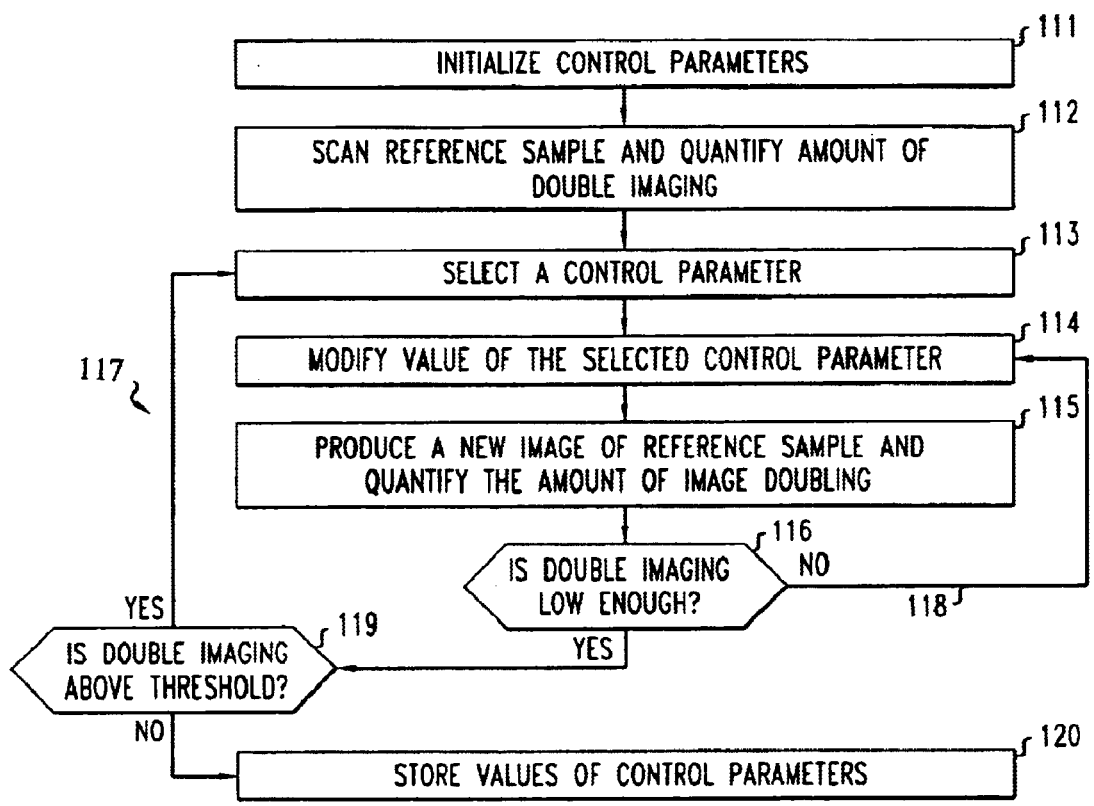
FIG. 12 is a flow chart for a process of calibrating the scanning system of FIG. 1A to correctly determine scanned spot locations.

FIG. 12 is a flow chart of an iterative process 82A for calibrating the control parameters used to determine locations of scanned spots in process 81 of FIG. 10. The iterative process 82A starts by initializing the values of the control parameters. (step 111). Next, a scan image is made of the reference sample based on the initial values of the control parameters, and the amount of double imaging in the image is quantified (step 112). Double imaging occurs if one or more of the control parameters has an improper value. The amount of double imaging may be quantified by evaluating an intensity-intensity correlation of the image. If double imaging exists, the intensity-intensity correlation has a maximum at non-zero pixel separations. Next, one of the control parameters is selected (step 113). The value of the selected control parameter is modified, e.g., incrementally from its initial value (step 114). From the new set of values for the control parameters, a new image of the reference sample is produced, and the amount of double imaging in the new image is evaluated (step 115). For the quantitative evaluations of the present and previous amounts of double imaging, a determination is made of whether the present amount of double imaging is now acceptably low (step 116). For example, the amount of double imaging is acceptably low if all nearby values of the selected control parameter produce more double imaging. If the amount of double imaging is acceptable low, the process 82A includes looping back to select another control parameter to modify (step 117). If amount of double imaging is not acceptably low, the process 82A includes looping back to modify the value of the same selected control parameter (step 118).

The process 82A iteratively selects and modifies values of the control parameters until a below-threshold amount of double imaging results (step 119). When process 82A determines that the amount of double imaging is below threshold, the present values of the control parameters are stored as the calibrated values for use in image scanning of samples (step 120).

In process 82A, the iterative adjustments change the value of a selected control parameter and determine whether an image has less feature doubling for the new value than for the previous value of the parameter. With the circuit 40A of FIG. 11A, the determinations entail performing a new scan, constructing a new image from the new scan, and comparing amounts of feature doubling in the images made from the new and last scans. With the circuit 40B of FIG. 11B, the determinations entail redetermining the intensities of image pixels from the last scan's data and recalculated locations for the scanned spots based on the new value of the selected control parameter. Amounts of double imaging may, e.g., be measured by distances between multiple images of the same feature on the reference sample. Double imaging is reduced if distances between the multiple images decrease.

Typically, parameters that define phase lags of the oscillatory motions of scan fiber 18 with respect to the AC driving voltage signals are calibrated first. Then, parameters defining cross-couplings between motions of the scan fiber 18 in different directions are calibrated. The cross-couplings generally produce a phase effect that is only about 1 to about 10 percent of the phase associated with the lag between the oscillatory motions and the driving AC voltages.

Figure 13:
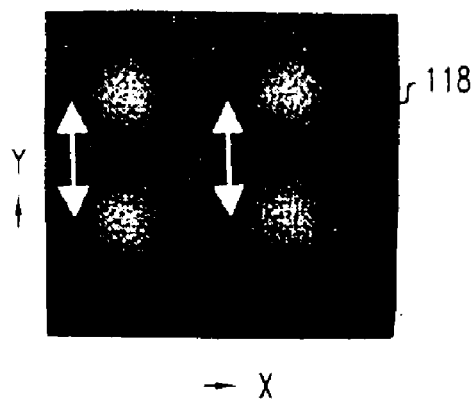
FIGS. 13A–13C is a sequence of scan images illustrating the calibration process of FIG. 12.
Figure 13:
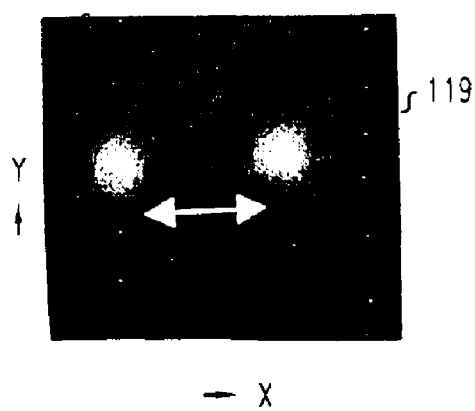
Figure 13:
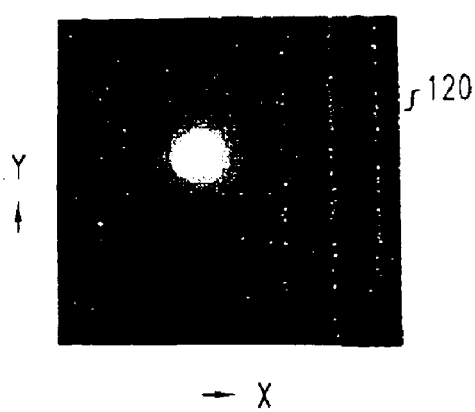

FIGS. 13A to 13C illustrate process 82A of FIG. 12 for a reference sample that includes a single small sphere. FIG. 13A shows the initial scan image 118 of the reference sample. Image doubling is evident in both the X and Y directions, because four images of the small sphere are discernable. FIG. 13B shows a new scan image 119 produced after proper calibration of the control parameter defining the phase lag of Y-coordinate motion of scan fiber 18, e.g., the control voltage applied to control terminal 99 in FIG. 11A. In the new scan image 119, image doubling is absent in the Y-coordinate. FIG. 13C shows a final scan image 120 made after proper calibration of the parameter defining the phase lag between X-coordinate motion of the scan fiber 18, e.g., the control voltage applied to control terminal 82A in FIG. 11A. In the final scan image 120, image doubling is absent, because a single sphere is visible.

Other embodiments of the invention will be apparent to those skilled in the art in light of the above-disclosure, the drawings, and the claims.

What is claimed is:

1. An optical scanning system, comprising:
   a probe comprising:
      a mechanical oscillator responsive to AC voltage signals; and
      an optical fiber having a free end that executes an oscillatory scanning motion in response to being mechanically driven by the mechanical oscillator; and
   a processor configured to receive measured intensities of light emitted from spots of a sample scanned by light from the free end of the optical fiber, the processor configured to assign intensities to image pixels based on the measured intensities of light in a manner that compensates for a non-uniform distribution of the scanned spots, the non-uniform distribution being produced by the oscillatory scanning motion of the free end; and
   wherein the free end of the optical fiber has first and second resonant frequencies for oscillatory motion in respective first and second directions.

2. The optical scanning system of claim 1, further comprising:
   a detector coupled to measure the intensities of light emitted by the scanned spots and to transmit the measured intensities to the processor.

3. The optical scanning system of claim 1, further comprising a strut fixed to the fiber, the strut stiffening the free end more in the first direction than in the second direction.

4. The optical scanning system of claim 1, wherein the free end of the optical fiber has a non-axially symmetric cross-section.

5. The optical scanning system of claim 1, wherein the processor assigns an intensity to one of the image pixels that is an average of the measured intensities of light emitted by the scanned spots whose locations correspond to the one of the image pixels.

6. The optical scanning system of claim 1, wherein the processor selectively assigns intensities to ones of the image pixels based on the measured intensities of light emitted by either first or last scanned spots corresponding to the ones of the image pixels.

7. The optical scanning system of claim 2, further comprising:

an optical system to focus the light emitted from the free end of the scan fiber to the spots and to route light emitted by the spots to the detector, the optical system including an element that transmits the light from the fiber end and reflects the light emitted by the scanned spots.

8. The optical scanning system of claim 2, further comprising:

an optical fiber that optically connects the remote probe to the detector.

9. The scanning system of claim 1, further comprising:

a source of pulsed light; and a portion of transmission optical fiber to deliver the pulsed light from the source to the scan probe, the portion of transmission optical fiber being a multimode fiber.

10. A process for optically scanning a sample, comprising:

moving an end of an optical fiber along a path that crosses itself by driving the fiber with a mechanical oscillator;

scanning a plurality of spots in a sample with light from the moving end of the fiber; and assigning intensities to image pixels based on measured intensities of light emitted by the scanned spots, the assigning including tracking numbers of ones of the scanned spots that correspond to ones of the image pixels based on locations of the scanned spots.

11. The process of claim 10, further comprising:

measuring the intensities of light emitted by the spots in response to being scanned.

12. The process of claim 11, wherein the scanning includes transmitting the light emitted by the moving end of the fiber through a material that selectively transmits scan light, and the measuring includes reflecting a portion of the light emitted by the scanned spots off the material.

13. The process of claim 10, wherein the assigning identifies the intensity of one of the image pixels with an average of the measured intensities of light emitted by the scanned spots corresponding to the one of the image pixels.

14. The process of claim 10, wherein the assigning identifies the intensities of ones of the image pixels with the measured intensities of light emitted by first ones of the scanned spots corresponding to the ones of the image pixels.

15. The process of claim 10, wherein the moving includes applying an AC voltage signal with a superposition of a first frequency and a second frequency to the oscillator, the first and second frequencies being near resonant frequencies for motion of the fiber in first and second directions, respectively.

16. A process of claim 15, wherein the assigning further comprises:

finding locations of the scanned spots from the AC voltage signal and identifying that one of the scanned spots corresponds to one of the image pixels based on the found location of the one of the scanned spots.

17. The process of claim 10, wherein the light emitted from the moving end of the fiber and the light whose intensities are measured have different wavelengths.

18. The process of claim 10, wherein the measured intensities include contributions from light emitted from the moving end and scattered by the scanned spots.

* * * * *